Dec. 22, 1942.         A. CAPREZ                2,306,013
                    FLANGE LUBRICATOR
              Filed June 14, 1940         2 Sheets-Sheet 1

INVENTOR.
Anton Caprez
BY Henry J. E. Metzler
Agent

Dec. 22, 1942.     A. CAPREZ     2,306,013
FLANGE LUBRICATOR
Filed June 14, 1940     2 Sheets-Sheet 2

INVENTOR.
Anton Caprez
BY Henry J. E. Metzler
Agt.

Patented Dec. 22, 1942

2,306,013

UNITED STATES PATENT OFFICE 2,306,013

FLANGE LUBRICATOR

Anton Caprez, Samaden, Switzerland

Application June 14, 1940, Serial No. 340,530

2 Claims. (Cl. 184—3)

My invention relates to improvements in flange lubricators for railway vehicles whereby the inside of the flanges and throats of the wheels of the vehicle, at curves in the track-rails, may be properly lubricated, whereby the lubrication of the throats and flange bearing against the outside rail of the curve will be automatically induced through the relative movement between the vehicle body and its truck by each curve, and whereby the said lubrication will be automatically cut off when the vehicle approaches straight track, or when it is standing on a curve; and the objects of my improvement are, first, to eject the lubricant by varying pressure toward the flanges and throats during each lubrication process in such a manner that not only one but several rings of lubricant are formed on the flanges and throats of the turning wheels; second, to dispense with compression-tubes for lubricant; third, to eliminate the necessity of long lubricant pipes; fourth, to move the lubricant to and from the lubricant reservoir before it is used for lubrication in order to prevent the lubricant from becoming stiff in cold weather; fifth, to have two possible adjustments to permit the desired restricted flow of lubricant as the service may require; sixth, to require only a minimum of compressed air; and seventh, to reduce the wear and tear and to increase the dependability in operation, due to the fact that only a small number of movable and friction producing parts are used.

Figure 1:
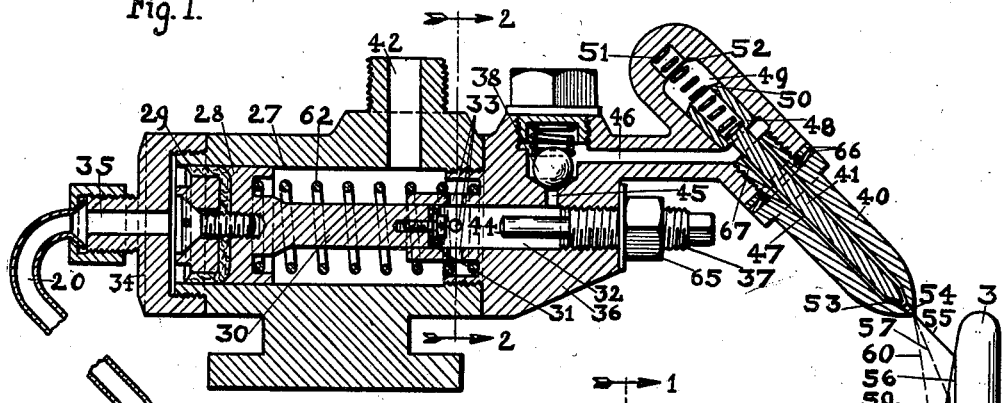
Figure 2:
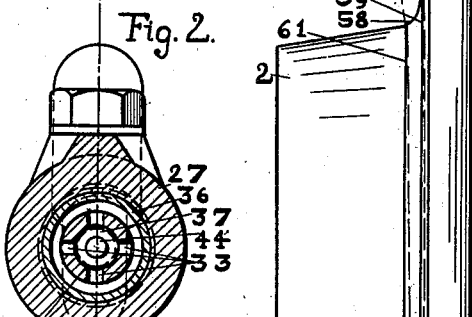
Figure 5:
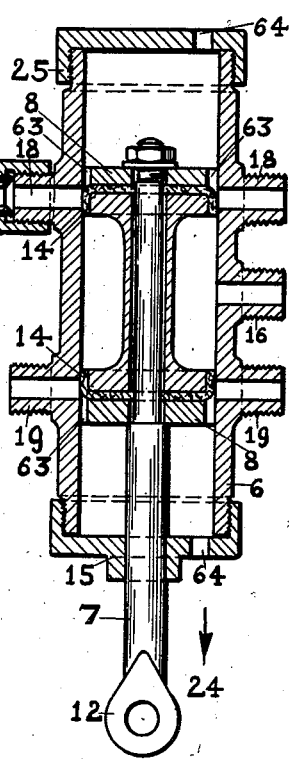
Figure 6:
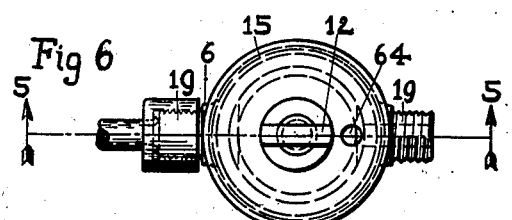
Figure 3:
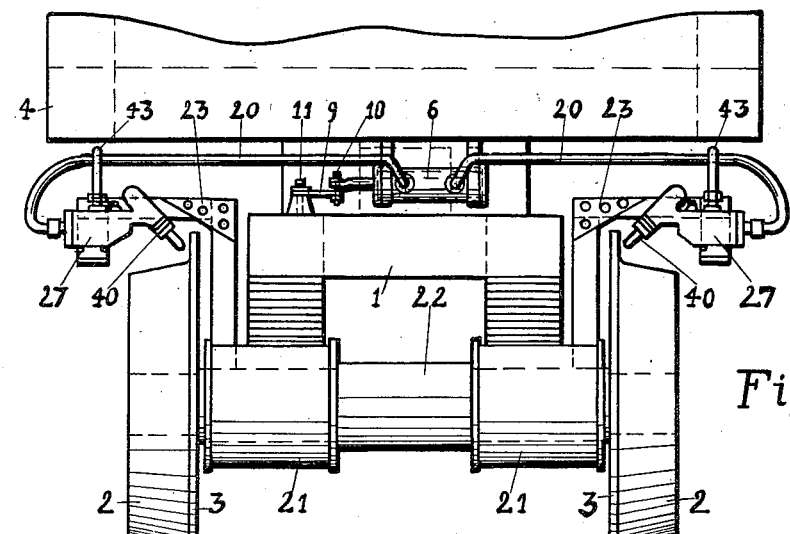
Figure 4:
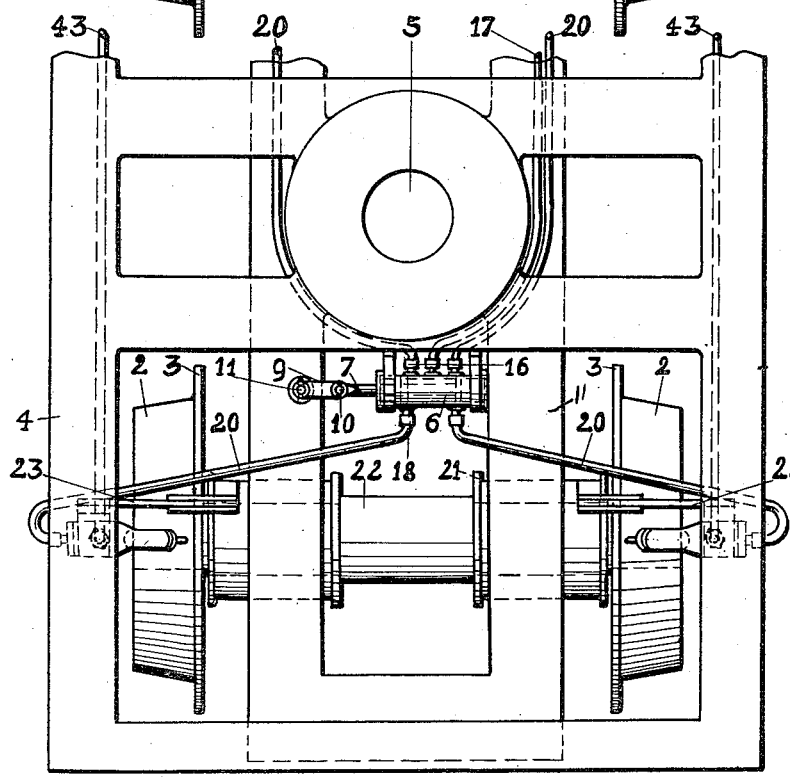

I attain these objects by mechanism illustrated in the accompanying drawings, in which:

Figure 1 is a longitudinal section of an ejector on the line 1—1, Fig. 2 shown in the process of ejecting lubricant against a wheel, the latter being shown in elevational view; Fig. 2, a section on the line 2—2, Fig. 1; Fig. 3, a front elevation of a portion of a vehicle, showing my improved flange lubricator applied thereto and in elevation; Fig. 4, a plan view of a portion of a vehicle as it appears after the removal of the vehicle body from the frame, showing parts of my improved flange lubricator applied thereto; Fig. 5, a longitudinal section of a device which controls the ejectors; and Fig. 6, a plan view of this device.

Similar numerals refer to similar parts throughout the several views.

The essential parts of my improved flange lubricator for each vehicle are, the ejectors and a device which controls the ejectors. One ejector is affixed adjacent each wheel. The device which controls the ejectors is of a design similar to a double acting pump and is connected by pipes or by flexible tubes to the ejectors.

In Figs. 3 and 4, I have shown a portion of a truck frame 4 having wheels 2 with flanges 3, the truck being capable of angular movement with respect to the frame 4 of the vehicle body around a center pin 6.

The cylinder 6 of the device which controls the ejectors may be secured to the body frame 4. The rod 7, which is secured to the piston 8 within the cylinder 6, is pivotally connected to a shackle 9 by a pin 10 passing through both, the one end of the shackle 9 and the flattened end 12 of the rod 7. The other end of the shackle 9 is pivotally connected to a pin 11 affixed on the truck frame (see Figs. 3, 4, and 5). Each of the pistons 8 is provided with a suitable packing means, such as a cup leather 14, in order to make it air tight. The rod 7 secured to the pistons 8 is slidably supported by means of a cover 15, the latter being secured to one end of the cylinder 6. In the wall of the cylinder 6 at the half way point is an opening 16 for a pipe connection which is connected by an air conduit 17 to the usual air line on the vehicle not shown. Furthermore, in the wall of the cylinder 6 are openings 18 and 19 for pipe connections. Each of the openings 18 and 19 is connected by an air conduit 20 to one of the ejectors. Each ejector is secured, by means of a support 23, to one of the bearings 21 in which turns the shaft 22 carrying the wheels 2. Each ejector on the right side of the vehicle is connected to one of the openings 18 (two in the present instance) by an air conduit 20, and each ejector on the left side of the vehicle is connected to one of the openings 19 (two in the present instance) by an air conduit 20.

When the vehicle to which the device is attached is on straight track, the rod 7 and the pistons 8 are in the position shown in Fig. 5, so that the openings 18 and 19 are shut off from the opening 16 by means of the packings 14. When the vehicle is rounding a curve to the right, the truck 1 will swing in a clockwise direction around its center pin 5, ahead of the turning movement of the vehicle body and its frame 4. This relative angular motion between the truck and the vehicle body causes the rod 7 and the pistons 8 to move in the direction of the arrow 24. As soon as the openings 19 are between the pistons 8, compressed air entering into the cylinder 6 through the opening 16, passes through the openings 19 to the ejectors on the left side of the vehicle, while the openings 18, which are connected to the ejectors on the right hand side of the vehicle, are still shut off from the compressed air by means of the packings of that piston 8 which is now situated between the openings 18 and the opening 16.

Should the vehicle go around a curve to the left, the truck 1 will swing in an anti-clockwise direction around its center pin 5, ahead of the turning movement of the vehicle body and its frame 4. This relative angular motion between the truck and vehicle body causes the rod 7 and the pistons to move in the direction opposite to the arrow 24, so that the compressed air between the pistons 8 may pass out through the openings 18 to the ejectors on the right hand side of the vehicle, while now the openings 19 are shut off from the opening 16 by the packing means of the other piston 8 now situated between the openings 19 and the openings 16.

It will be obvious that the cylinder 6 may be otherwise located, for instance secured to the truck 1. In this case, the pin 11 would be secured to the body frame 4.

Referring now to one of the lubricant ejectors as shown in Figs. 1 and 2, the main parts of each ejector are an air operated lubricant plunger pump, a valve controlled by the pressure of the lubricant, and a check valve. The air operated plunger pump consists of a cylinder 27 within which a spring biased piston 28 is slidable. The piston 28 is provided with a suitable packing means, such as a cup leather 29, in order to make it liquid and air tight. A smaller piston 30, which may be a unit with the piston 28 (as in the instance shown) or which may be secured to the piston 28, is provided with a suitable packing means 31 and is slidable within a smaller cylinder 32. The inside of the cylinder 32 is in communication with the cylinder 27 by openings 33. The cylinder 27 is closed on the one end by a cover 34, provided with an opening 35 for a pipe connection, and is closed on the other end by the part 36. The part 36, which is a unit with cylinder 32, carries a screw 37, a non-return check valve 38, and a nozzle 40. Within the nozzle 40 is a spring biased needle valve 41 slidable. The cylinder 27, furthermore, is provided with an opening 42 to which a pipe 43 (Figs. 3 and 4), leading to a lubricant holding receptacle (not shown), is connected.

Said lubricant holding receptacle may be affixed to the vehicle at any suitable place higher than the ejectors in order to convey lubricant to the ejectors by gravity.

If my improved flange lubricator should be applied to a vehicle which is constructed essentially for use in very cold regions, a small lubricant holding receptacle may be affixed directly above the opening 42 of each ejector, or one receptacle may be affixed between every two ejectors. If a small lubricant holding receptacle is affixed directly above each ejector, no lubricant conduits are necessary. If one lubricant holding receptacle is used for a pair of ejectors, only short lubricant conduits are necessary. It is important, in very cold regions, to eliminate the use of lubricant conduits or, at least, of long lubricant conduits, because lubricant usually becomes stiff very quickly within long conduits if the temperature is near the freezing point. Very small lubricant holding receptacles may be used when each receptacle provides lubricant to only one or two ejectors, because a very small quantity of lubricant is sufficient for each lubrication process, as referred to hereinafter. Any suitable kind of commonly known lubricant holding receptacles may be used, therefore the receptacles need not be shown in the drawings.

When the vehicle is on straight track, the pistons 28 and 30 are in the position shown in Fig. 1, and the cylinders 27 and 32 are filled with lubricant. When compressed air enters through conduit 20, while the vehicle is rounding a curve, as previously referred to, the pistons 28 and 30 will be pushed further into the cylinders 27 and 32, to a position in which the piston 30 is resting against the end 44 of the screw 37. Thereby, lubricant from the cylinder 27 is pressed backward through the opening 42 into the tube 43 and into the lubricant holding receptacle, by means of the piston 28, and the lubricant from the cylinder 32 is pressed, by means of the piston 30, through the passage 46 into the passage 47 in which the needle valve 41 is slidable. The diameter of the shaft of said needle valve 42 is smaller than the diameter of the passage 47. In the duration of the stroke of the piston 30 from the position shown in Fig. 1 to the position in which it is resting against the end 44 of the screw 37, the lubricant pressure is about the same as the pressure of the compressed air. This pressure pushes the piston 48, which is a unit with the valve needle 41, backward within the cylinder 49 so that the part 50, which is guiding the spring 51, is resting against the narrow part 52 of the cylinder 49. Now the pointed end 53 of the valve needle no longer closes the jet 54 of the nozzle 40, and, therefore, lubricant is ejected, by a pressure nearly equal to the pressure of the compressed air, as a straight stream 55 to the flange 3 of the turning wheel 2, forming on the flange a lubricant ring 56. When the travel of the piston 30 is completed, so that it is resting against the end 44 of the screw 37, the check valve 38 closes, preventing the lubricant from moving backward through the passages 45 and 46, and the lubricant within the passages 46 and 47 is now under the pressure of the spring 51 by means of the piston 48. This pressure is less than the pressure of the compressed air, so that the lubricant is now ejected with less pressure than before as a stream 57, forming a second ring 59 on the flange 3 or throat 58 of the turning wheel 2. In the duration of the stroke of the piston 48 downward toward the nozzle 40, the pressure of the spring 51 decreases gradually; the lubricant is then ejected by less and less pressure, finally as a stream 60 to the throat 58 of the wheel 2, forming a final lubricant ring 61 before the jet 54 is closed by the pointed end 53 of the valve needle.

Due to the fact that the lubricant stream from its highest pressure to its lowest pressure is not interrupted, the lubricant rings 56, 59, and 61 form a spiral covering broadly the flange and throat of the turning wheel, although only a small quantity of lubricant is ejected during each lubrication process.

The pistons 28 and 30 can not be moved backward to the position shown in Fig. 1 by means of the spring 62, unless the vehicle is on straight track. As soon as the vehicle is on straight track, the air pressure is disconnected from the conduit 20 by means of the packing means 14 of the piston 8, as previously referred to. Thus, if the vehicle happens to be standing on a curve for some length of time, no more lubricant is ejected or dripped to the wheels, because the openings 33 in the cylinder 32 are closed by the piston 30, which is still resting against the end 44 of the screw 37, and because the check valve 38 is closed as well.

When the vehicle to which the device is attached has rounded a curve and approaches straight track, the truck 1 swings back to its normal position, and the rod 7 as well as the pistons 8 are moved back to the position shown in Fig. 5, so that the spring 62 may press the pistons 28 and 30 back to the position shown in Fig. 1, whereby lubricant will be sucked through the opening 42 into the cylinder 27 as well as into the cylinder 32. At the same time, the air ahead of the piston 28 is pressed back through the conduit 20, passing through the openings 18 or 19, as the case may be, and passing through the passage 63, which extends through the pistons 8. The air can then escape through the passage 64, which extends through the cover 15 and 25 respectively. The packing means 14 are of any approved design and are secured to the pistons 8 in such a manner that they, when the pistons 8 are in the position shown in Fig. 5, shut off the openings 18 and 19 from the opening 16, but that an air flow may pass from the openings 18 and 19 through the passages 63.

The piston 48, while moving from the position in which the part 50 rests against the narrow part 52 toward the nozzle 40, creates a vacuum back of the piston 48 within the cylinder 49. This vacuum causes a slowing up of the travel of the piston 48 downward, while ejecting, and an acceleration of the travel of the piston 48 upward, toward the narrow part 52, when the next lubrication process starts.

The travel of the piston 30 may be adjusted by means of the screw 37, which may be held in adjusted position by means of a lock nut 65. This adjustment permits the desired restricted amount of lubricant to be ejected during each lubrication process, as the service and the length of the curves may require.

A second possibility of adjustment is the alteration of the travel of the piston 48 by means of inserting more or fewer washers 66 (two in the present instance) between the nozzle 40 and the part 36 at the place where the nozzle 40 is secured to the part 36 by means of a long pipe union 67. These two possibilities of adjustment at each lubricant ejector also allows each wheel to be provided with a restricted desired amount of lubricant, according to the size of the wheel, so that no lubricant may be wasted and that only a minimum of lubricant will be required.

The sliding movement of the valve needle 41 within the nozzle 40 during each lubrication process prevents the nozzle from becoming clogged by dirt and grit if the lubricant should contain any particles of dirt or grit.

I am aware that prior to my invention flange lubricators have been made operative in response to relative movement between vehicle parts in rounding curves. I, therefore, do not claim such a device broadly; but I claim:

1. In a flange lubricator for railway vehicles, the combination of an air-operated lubricant plunger pump connected to a nozzle by a check valve, with a needle valve slidable within said nozzle, said needle valve being combined on its upper end with a spring biased piston (48) which is slidable within a cylinder (49) and adapted to create a vacuum within the cylinder (49) to delay the closing movement of the said needle valve; and washers (66) between the cylinder (49) and said nozzle, the upper part of the nozzle being screwed into the cylinder more or less deeply according to the number of washers inserted, substantially as described.

2. A flange lubricator for railway vehicles comprising an air-operated lubricant plunger pump the stroke of which is adjustable and which is connected to a nozzle by a check valve, a valve needle slidable in said nozzle, a piston (48) combined with the upper end of said valve needle, a cylinder (49) within which said piston (48) is slidable and which is closed in back of the piston, a long coiled spring extending through said cylinder and biasing said piston (48) and said valve needle toward the outlet opening of said nozzle, and washers (66) between the lower end of said cylinder (49) and the upper end of said nozzle, the nozzle being secured to said cylinder (49) by a long pipe union and said spring (51) having enough flexure to allow adjustment of the stroke of the valve needle by inserting more or fewer washers (66).

ANTON CAPREZ.